(12) United States Patent
Dietrich et al.

(10) Patent No.: US 7,769,353 B2
(45) Date of Patent: Aug. 3, 2010

(54) MOBILE COMMUNICATION DEVICE INCLUDING AN EXTENDED ARRAY SENSOR

(75) Inventors: Aaron Dietrich, Caledonia, IL (US);
Michael Charlier, Palatine, IL (US);
Thomas Gitzinger, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1831 days.

(21) Appl. No.: 10/158,301

(22) Filed: May 30, 2002

(65) Prior Publication Data
US 2004/0204190 A1   Oct. 14, 2004

(51) Int. Cl.
*H04B 1/38* (2006.01)
*H04M 1/00* (2006.01)

(52) U.S. Cl. .................. 455/90.3; 455/90.1; 455/575.1; 455/550.1

(58) Field of Classification Search .................... 455/90, 455/575, 572, 569, 566, 550, 575.1, 90.3, 455/90.1, 550.1, 556.1, 556.2, 557; 324/688, 324/674; 361/280, 179, 181, 281; 345/702; 379/433.01; 348/254, 222.1
See application file for complete search history.

(56) References Cited

U.S. PATENT DOCUMENTS

| | | | |
|---|---|---|---|
| 5,337,353 A * | 8/1994 | Boie et al. ............. | 379/433.01 |
| 5,541,609 A * | 7/1996 | Stutzman et al. ............ | 343/702 |
| 5,559,504 A | 9/1996 | Itsumi et al. | |
| 5,565,658 A | 10/1996 | Gerpheide et al. | |
| 5,861,875 A | 1/1999 | Gerpheide | |
| 6,222,528 B1 | 4/2001 | Gerpheide et al. | |
| 6,442,013 B1 * | 8/2002 | Lindgren et al. ............. | 361/280 |
| 6,546,101 B1 * | 4/2003 | Murray et al. ......... | 379/433.02 |
| 2002/0049070 A1 | 4/2002 | Bick | |
| 2002/0068537 A1 * | 6/2002 | Shim et al. ............... | 455/177.1 |

FOREIGN PATENT DOCUMENTS

| | | |
|---|---|---|
| AU | 704945 B2 | 1/1997 |
| JP | 07-168930 A | 7/1995 |
| JP | 2000-295327 A | 10/2000 |
| JP | 2001-311946 A | 9/2001 |
| JP | 2002-082914 A | 3/2002 |
| KR | 2003-18523 A | 3/2003 |
| WO | 0079768 A1 | 12/2000 |

OTHER PUBLICATIONS

Korean Patent Office Action; dated May 26, 2006; counterpart Motorola; 1 pages.
Japanese Patent Office Action; dated Nov. 16, 2006; counterpart Motorola; 2 pages.

\* cited by examiner

Primary Examiner—John Lee (57) ABSTRACT

An apparatus and method utilizing a mobile communication device including a housing, an earpiece coupled to the housing, a keypad coupled to the housing, and an array sensor coupled to the housing. The array sensor is distributed across a significant portion of a face of the housing to allow the detection of various conductive profiles in close proximity to the housing. A portion of the array sensor may be positioned underneath the keypad. The mobile communication device can sense a change in a field across the array sensor and adjust a parameter of operation of the mobile communication device based on the change in the field across the array sensor in response to a conductive profile.

31 Claims, 5 Drawing Sheets

MOBILE COMMUNICATION DEVICE INCLUDING AN EXTENDED ARRAY SENSOR

BACKGROUND OF THE INVENTION

1. Field of Invention

The present invention is directed to a method and apparatus utilizing a portable device including an extended array sensor. In particular, the present invention relates to a hand-held portable device including an array sensor that extends around portions of the device aside from or in addition to a portion including a keypad.

2. Description of Related Art

Presently, mobile communication devices and hand held portable devices such as mobile phones, pagers, portable games, remote controls, and the like, provide communication and other functionality for users on the go. For example, a user with a mobile phone can place a call while engaging in another activity, such as walking. Unfortunately, the user may not hold the mobile phone properly against the user's head for optimal performance. For example, the user may hold the phone with the microphone away from the user's mouth. This can adversely affect microphone performance, which results in poor detection of the user's voice. Also, the user may hold the phone with the speaker away from the user's ear. This can adversely affect speaker performance, which results in a user not optimally hearing the output of the speaker. Furthermore, the user may hold the phone with the antenna at a varying distance from the user's head. This can adversely affect antenna and transmission performance because of sub-optimal tuning of antenna matching circuitry.

Unfortunately, present mobile communication devices do not address these problems. In particular, present mobile communication devices cannot address these problems because they are unable to detect the positioning of a mobile communication device against a user's head.

Capacitive-based touch pads are disclosed in U.S. Pat. No. 5,565,658, issued on Oct. 15, 1996 to Gerpheide et al., U.S. Pat. No. 5,861,875, issued on Jan. 19, 1999 to Gerpheide, and U.S. Pat. No. 6,222,528 B1, issued on Apr. 24, 2001 to Gerpheide et al. These touch pads are disclosed as being a replacement for a mouse on both laptop and desktop computers. In particular, these touch pads are disclosed as being particularly useful as replacement pointing devices on computers utilizing full keyboards and displays such as monitors or large LCD displays. These touch pads are only disclosed as being useful for data entry on a computer.

Therefore, there is a need for a means for improving mobile communication device performance. For example, there is a need for improving mobile communication device performance based on detecting external objects that affect the performance of the mobile communication device and adjusting parameters of operation of the mobile communication device to account for the external objects.

SUMMARY OF THE INVENTION

The invention provides an apparatus and method utilizing a mobile communication device including a housing, an earpiece coupled to the housing, a keypad coupled to the housing, and an array sensor coupled to the housing. The array sensor is distributed across a significant portion of a face of the housing to allow the detection of various conductive profiles in close proximity to the housing. A portion of the array sensor may be positioned underneath the keypad. The mobile communication device can sense a change in a field across the array sensor and adjust a parameter of operation of the mobile communication device in response to the change in the field across the array sensor based on a conductive profile in close proximity to the housing.

Thus, the invention can improve operation of the mobile communication device by detecting external objects that affect the performance of the mobile communication device. The invention can then adjust parameters of operation of the mobile communication device to account for the external objects and to improve operation of the mobile communication device.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
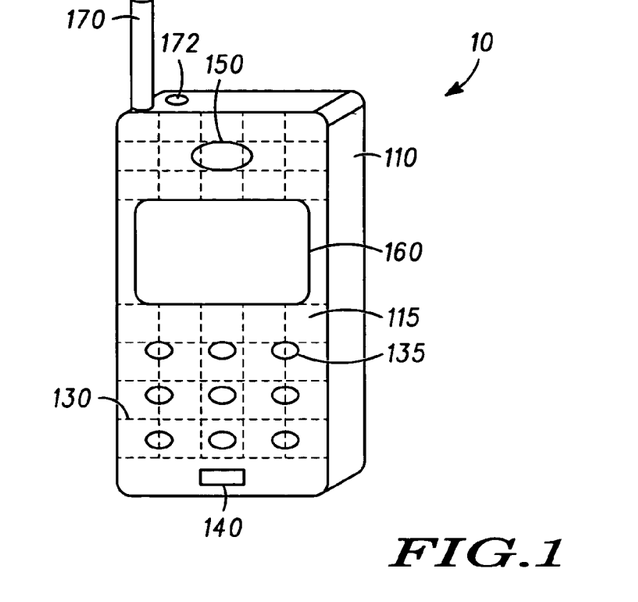
FIG. 1 is an exemplary illustration of a mobile communication device according to a first embodiment.

FIG. 1 is an exemplary illustration of a mobile communication device 10 according to one embodiment of the invention. The mobile communication device 10 may be any form of portable personal device, such as a personal digital assistant, a mobile phone, a pager, a portable game, or the like. The mobile communication device 10 can include a main housing 110 including a face 115, a touch pad or array sensor 130, a keypad 135, an audio input device 140, an audio output device such as a speaker or earpiece 150, a visual output device or display 160, an antenna 170, and antenna matching circuitry 172. The main housing 110 may include any combination of the keypad 135, the audio input device 140, the audio output device 150, the visual output device 160, and/or other components. The mobile communication device 10 does not necessarily require multiple input and output devices. For example, the mobile communication device may utilize only the array sensor 130 for input and the display 160 for output.

The keypad 135 may be a numeric keypad and a portion of the array sensor 130 may be located beneath the keypad 135. The audio input device 140 may be a microphone. The face 115 may include two sections. For example, a first section may include the keypad 135 and a second section may include the display 160 and/or the speaker 150. A portion or all of the array sensor 130 may be located in the section including the display 160 and/or the speaker 150. The array sensor 130 may also be an extended array sensor that covers an area including the keypad 135 and covers an area including the display 160 and/or the speaker 150.

The display 160 may be a LCD display, a LED display, or any other display useful for displaying visual information. The display 160 can incorporate a backlight for illuminating displayed information or portions of the mobile communication device 10. The array sensor 130 may be located underneath the keypad 135 located on the face of the first housing 115. The array sensor 130 may be an impedance sensor, a capacitive array sensor, an inductive array sensor, or any other sensor useful for sensing an object in close proximity to the array sensor 130. For example, the array sensor 130 may include x-axis and y-axis electrodes that are printed on a plastic substrate. These electrodes can be charged up and monitored for changes as described below.

In operation, the mobile communication device 10 can communicate with other mobile communication devices, base stations, or other devices that provide for communication. The audio input device 140 can receive audio signals for transmission and the audio output device 150 can output received communication signals in audio format. The display 160 can display visual information to a user of the mobile communication device 10, such as a dialed phone number, a signal strength indicator, phone book entries, text messages, icons, or any other useful visual information.

The array sensor 130 can be used to sense a change in a field across the array sensor 130. For example, the array sensor 130 may sense the location or the angle of a conductive object such as a human head, a hand, a table top, or any other conductive object. A parameter of operation of the mobile communication device 10 may then be adjusted based on the change in the field across the array sensor 130.

The array sensor 130 can also be tuned to detect the position of a conductive body, such as a finger, based on, for example, changes in the capacitances in electrodes. The sensitivity or range at which a body changes the capacitance of the electrode enough to be detected can be tunable from tenths of a millimeter to as much as over 12 millimeters. For example, the array sensor 130 can scan for a finger to come into a different distance that changes the capacitance of the array sensor 130 for activation. Thus, the invention can provide additional input functionality for a mobile communication device 10.

Figure 2:
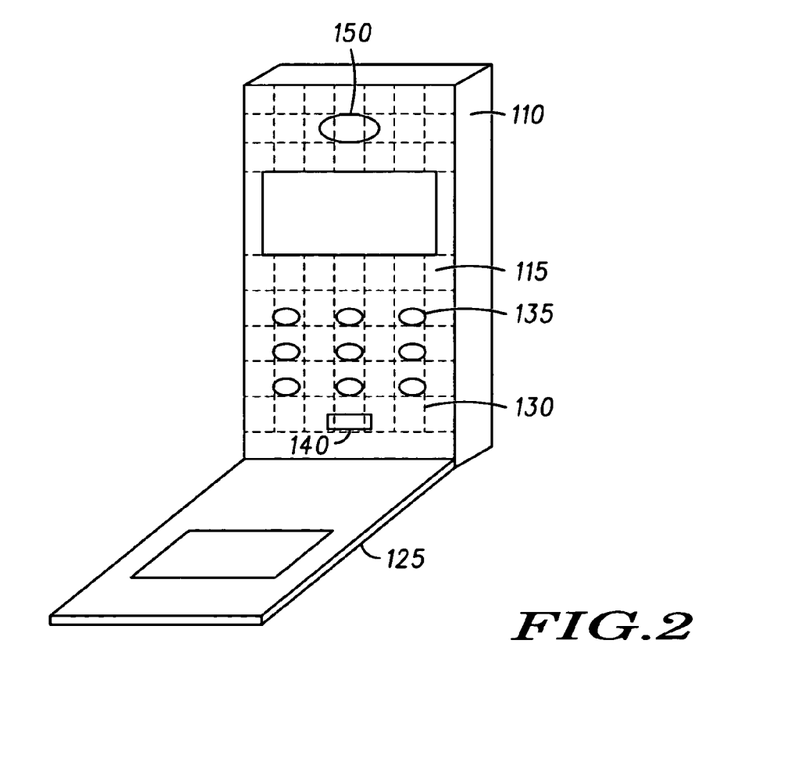
FIG. 2 is an exemplary illustration of the mobile communication device according to a second embodiment.

FIG. 2 is an exemplary illustration of the mobile communication device 10 according to a second embodiment. The mobile communication device 10 may include a face cover 125 which may open to provide access to at least a portion of or the entire face 115 of the housing 110 or may close to cover the face 115 or a portion of the face 115 of the housing 110. This diagram illustrates one example of the mobile communication device 10 with the face cover 125 in an open position. The face cover 125 may be coupled to the housing 110 by means of a rotatable coupling, a slidable coupling, a detachable coupling, or any other means for coupling a first housing to a second housing. For example, the face cover 125 may rotate about or slide along the face 115 of the housing 110 or may pivot along an edge of the housing 110. Additionally, the array sensor 130 may extend into a portion of the face cover 125.

In operation, when the face cover 125 is in a closed position, the array sensor 130 can adjust or increase its sensitivity from an open position sensitivity corresponding to the face of the first housing 115 to a closed position sensitivity corresponding to an exterior of the face cover 125. Thus, the invention can provide for additional input functionality, even when the keypad 135 is covered with the face cover 125 in a closed position.

Figure 3A:
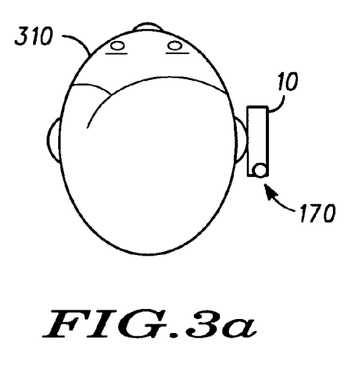
FIGS. 3*a*-3*d* are an exemplary illustrations of the use of a mobile communication device.
Figure 3B:
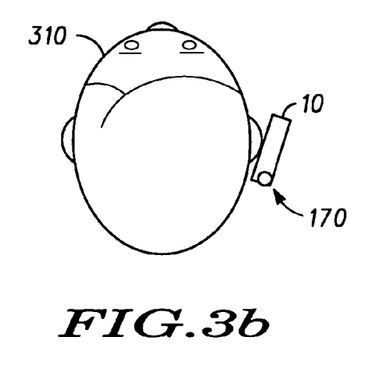

FIGS. 3*a*-3*d* are an exemplary illustrations of the use of a mobile communication device 10. For example, FIGS. 3*a*-3*d* illustrate different positions and angles of use of a mobile communication device 10 against a user's head 310. FIG. 3*a* illustrates the use of a mobile communication device 10 at a first angle. FIG. 3*b* illustrates the use of a mobile communication device 10 at a second angle. These two angles may affect the performance of the antenna 170. For example, the second angle may decrease performance of the antenna 170. Thus, different positions of the mobile communication device 10 may require adjustment of antenna matching circuitry 172 to obtain optimum performance of the antenna 170. The array sensor 130 can be used to sense the different positions to make appropriate adjustments for optimum performance.

Figure 3C:
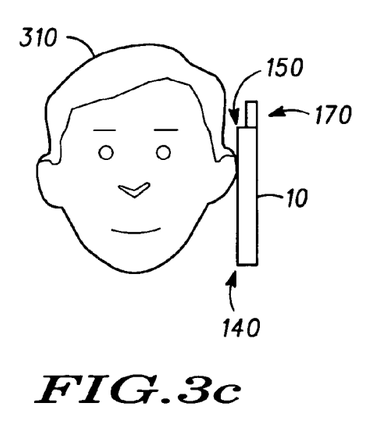
Figure 3D:
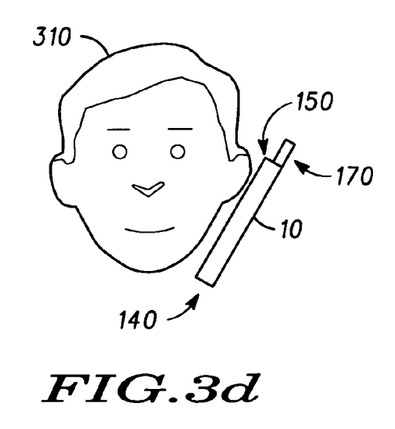

FIG. 3*c* illustrates the use of a mobile communication device 10 at a third angle. FIG. 3*d* illustrates the use of a mobile communication device 10 at a fourth angle. These different angles may also affect the performance of different components of the mobile communication device 10. For example, microphone 140 performance may be compromised when the microphone 140 is further from a user's mouth. The array sensor 130 can be used to sense a distance from the user's mouth or an angle against the user's head 310. Microphone sensitivity can then be adjusted to compensate for the location of the microphone 140. As another example, speaker 150 performance may be compromised when the speaker 150 is further from a user's ear. The array sensor 130 can be used to sense a distance from the user's ear or an angle against the user's head 310. Speaker gain or volume can then be adjusted to compensate for the location of the speaker 150.

Figure 4:
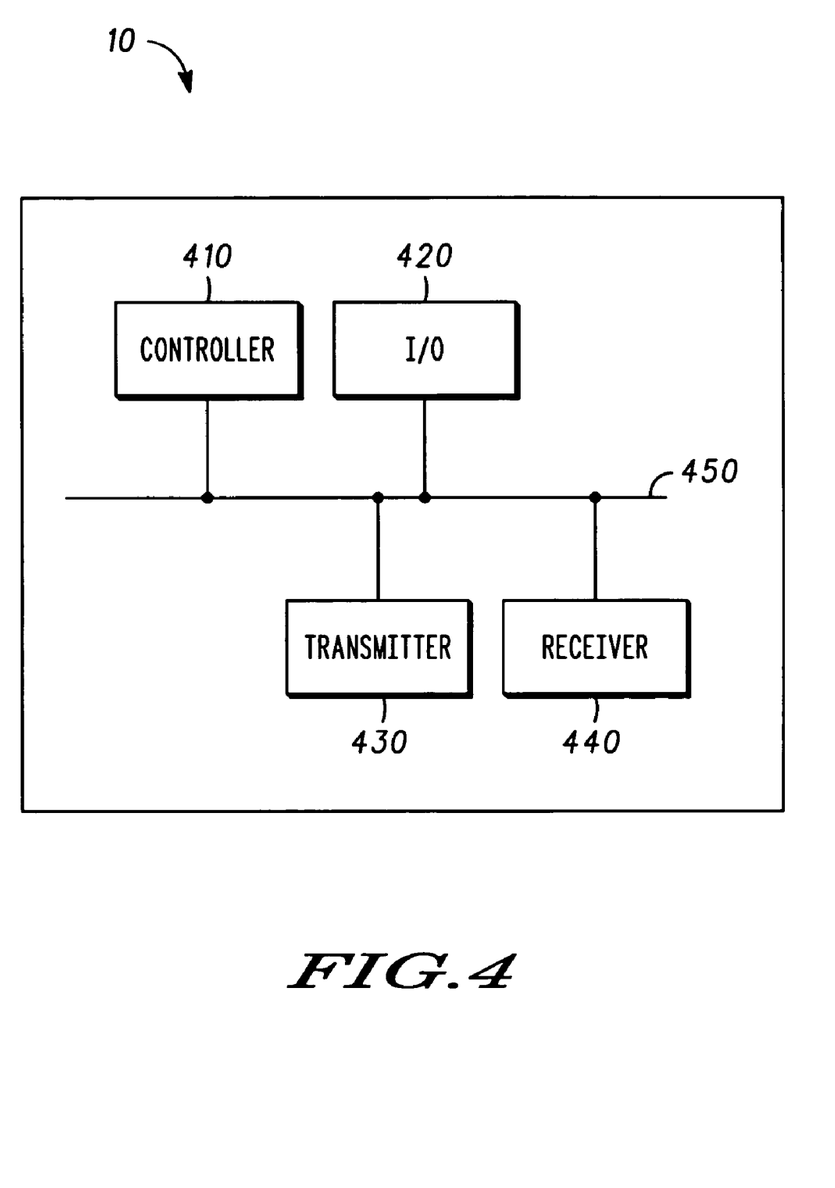
FIG. 4 is an exemplary block diagram of the mobile communication device according to another embodiment.

FIG. 4 is an exemplary block diagram of the mobile communication device 10 according to another embodiment. The mobile communication device 10 can include a controller 410, input/output (I/O) circuitry 420, transmitter circuitry 430, receiver circuitry 440, and a bus 450. In operation, the bus 450 allows the various circuitry and components of the mobile communication device 10 to communicate with each other. The I/O circuitry provides an interface for the I/O devices such as the array sensor 130, the keypad 135, the audio input device 140, the display 160, and the audio output device 150. The transmitter circuitry 430 provides for the transmission of communication signals to other mobile communication devices, base stations, or the like. The receiver circuitry 440 provides for the reception of communication signals from other mobile communication devices, base stations, or the like. The controller 410 controls the operation of the mobile communication device 10.

According to one embodiment, the controller 410 can sense a change in a capacitive field across the array sensor 130 and adjust a parameter of operation of the mobile communication device 10 based on the change in the capacitive field across the capacitive array sensor 130. The controller 410 may further sense a change in a capacitive field according to a conductive profile across the capacitive array sensor 130. The conductive profile may be a portion of a human facial profile such as a portion of a human head 310 or may be a portion of a human hand. The controller 410 may distinguish between two different conductive profiles to compare the profiles or to adjust a parameter of operation according to each of the detected profiles. The controller 410 may also determine a type of conductive profile using a three dimensional map of the conductive profile. The mobile communication device may include an antenna 170 and antenna matching circuitry 172 and the parameter of operation may be a tuning of the antenna matching circuitry 172. The parameter of operation may also be a volume of the earpiece 150. The controller 410 may additionally detect a distance of a portion of a human head 310 from the capacitive array sensor 130 and may increase a volume of the earpiece or speaker 150 based on the detected distance. The controller 410 may also detect a distance of a portion of a human head 310 from the capacitive array sensor 130 and the parameter of operation may be a sensitivity of a microphone 140 based on the detected distance. The conductive profile may be a conductive body external to the mobile communication device 10. The parameter of operation may be an illumination of the mobile communication device or an audible alert or a message regarding improving performance of the mobile communication device. For example, when the mobile communication device 10 is placed in a position that provides sub optimal performance, an alarm may sound and a message may be displayed indicating how to reposition the mobile communication device 10 to obtain better performance.

Figure 5:
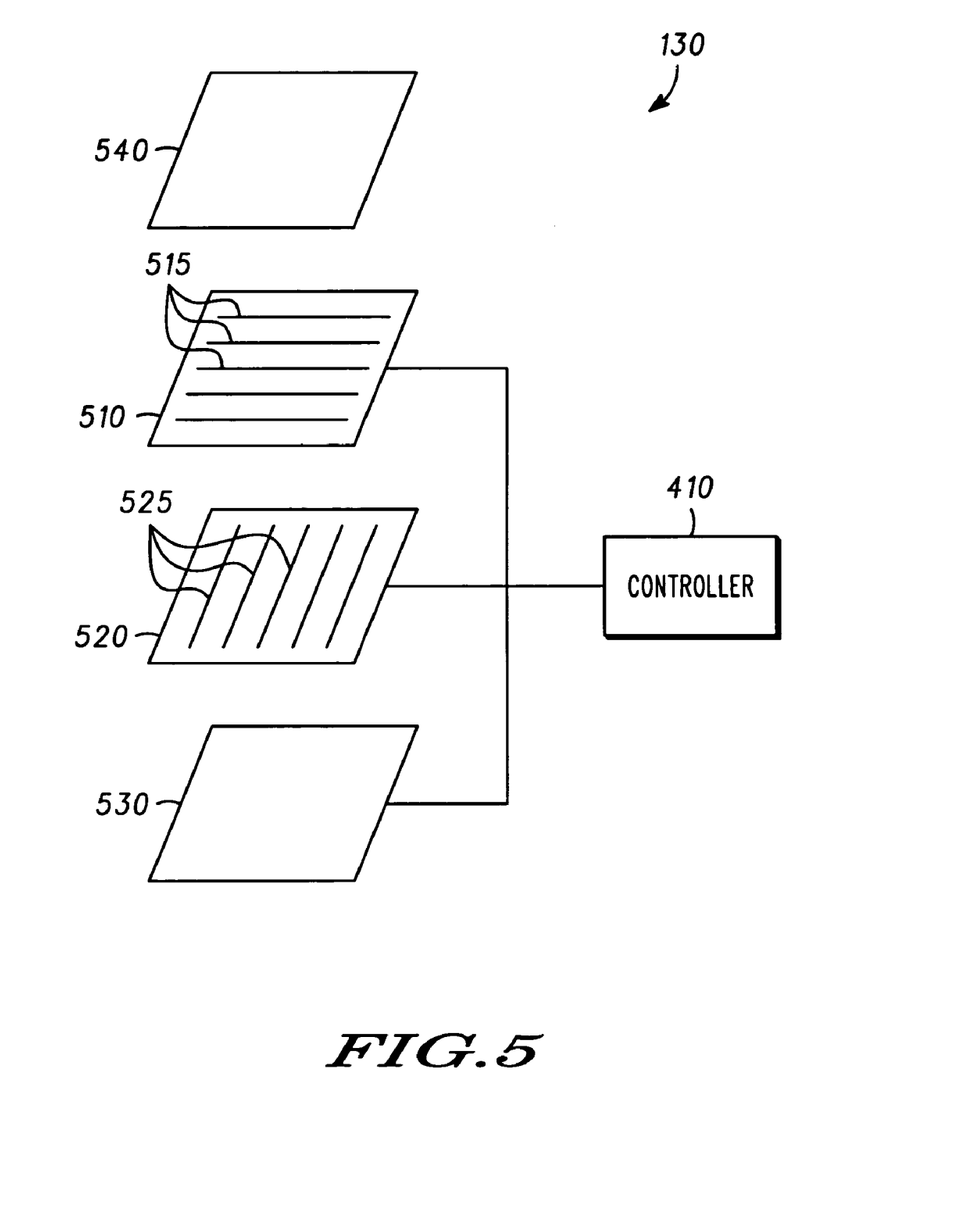
FIG. 5 is an exemplary illustration of a capacitive array sensor according to one embodiment.

FIG. 5 is an exemplary illustration of an example of the array sensor 130 as a capacitive array sensor 130 according to one embodiment. The array sensor 130 can include a first electrode array 510 including electrodes 515, a second electrode array 520 including electrodes 525, a touch pad surface 540, and a sense electrode 530. The first electrode array 510 can cross over the second electrode array 520 with the first array electrodes 515 perpendicular to the second array electrodes 525 to define a crossover region. A spacer such as a dielectric, an insulator, an air gap, or the like may separate the electrode arrays 510 and 520.

In operation, the first electrode array 510 can establish an electric field in conjunction with the second electrode array 520. This electric field can also be determined with respect to the sense electrode 530. The sense electrode 530 is not necessary for operation of the electrode arrays 510 and 520. In particular, an electric field or capacitances may be generated between the electrode arrays 510 and 520 without using a sense electrode 530. The controller 410 may supply electrical charges to the first electrode array 510 and the second electrode array 520 to develop the electric field such that a capacitance is present between the electrode arrays 510 and 520 or between each electrode array 510 and 520 and the sense electrode 530. The controller 410 may detect the presence of a conductive object in close proximity to the touch pad surface 540 based on effects of the conductive object on the capacitance. For example, a conductive object, such as a finger, in close proximity to the array sensor 130 can decrease the capacitance. The controller 410 can then detect the presence of the conductive object by measuring the decrease in capacitance. The controller 410 can then determine the position of the conductive object based on the changes in the capacitance relating to the relevant electrodes 515 and 525.

Figure 6:
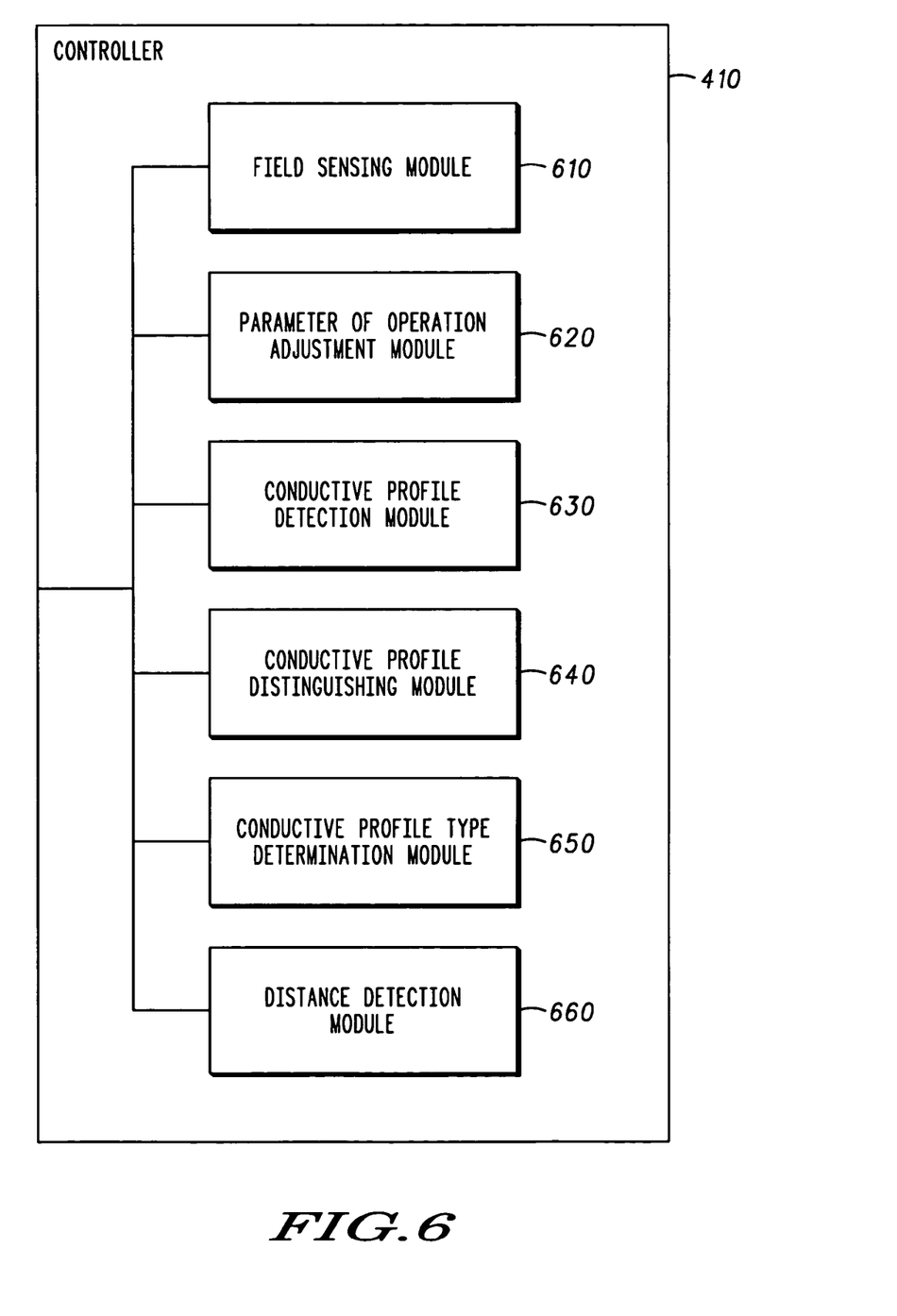
FIG. 6 is an exemplary block diagram of a controller according to one embodiment.

FIG. 6 is an exemplary block diagram of the controller 410 according to another embodiment. The controller 410 may include a field sensing module 610 coupled to the array sensor 130, a parameter of operation adjustment module 620 coupled to the field sensing module 610, a conductive profile detection module 630 coupled to the field sensing module 610, a conductive profile distinguishing module 640 coupled to the conductive profile detection module 630, a conductive profile type determination module 650 coupled to the conductive profile detection module, and a distance detection module 660 coupled to the field sensing module 610. In operation, the field sensing module 610 can be configured to sense a change in a field across the array sensor 130 and the parameter of operation adjustment module 620 can be configured to adjust a parameter of operation of the mobile communication device 10 based on the change in the field across the array sensor 130. The conductive profile detection module 630 can be configured to detect a conductive profile based on the change in the field sensed by the field sensing module 610. The conductive profile may be a portion of a human facial profile such as a portion of a human head 310 or the conductive profile may be a portion of a human hand. The conductive profile distinguishing module 640 may be configured to distinguish between two different conductive profiles. For example, the conductive profile distinguishing module 640 may distinguish between a close profile of a head 310 and a more distant profile of a head 310. As another example, the conductive profile distinguishing module 640 may distinguish between different angles that a mobile communication device 10 is placed against a head 310.

The conductive profile type determination module 650 may be configured to determine a type of conductive profile using a three dimensional map of the conductive profile. For example, different three dimensional maps may be used for each of a profile of a head 310, a profile of a hand, a profile of a table surface, profiles of different distances from a head 310, profiles of different angles to a head 310, profiles of different hand positions, or any other useful profiles. The parameter of operation may be a tuning of the antenna matching circuitry 172. The parameter of operation may also be a volume of the earpiece.

The distance detection module 660 may be configured to detect a distance of a portion of a human head from the array sensor and the parameter of operation adjustment module 620 may be further configured to increase a volume of the earpiece 150 based on the detected distance. The distance detection module 660 may also be configured to detect a distance of a portion of a human head 310 from the array sensor 130 and the parameter of operation adjustment module 620 may be further configured to increase a sensitivity of the microphone 140 based on the detected distance. The conductive profile may be a conductive body external to the mobile communication device 10. The parameter of operation may be an illumination of the mobile communication device 10. The parameter of operation may also be an audible alert.

Thus, an array sensor 130 can be placed near the display 160, near the earpiece 150, on the sides of the housing 110, or on the rear of the housing 110, or in any other useful position that indicates information such as how the mobile communication device 10 is being held. When the mobile communication device 10 is in a call and, for example, the array sensor 130 is not used for data entry, a proximity sensitivity of the array sensor 130 can be set at a maximum to detect a position of the mobile communication device 10 against a user's head 310. The position in which the mobile communication device 10 is held can be extrapolated from information from the array sensor 130. Antenna matching can then be tuned or a counter poise for the antenna 170 can be tuned to improve antenna performance. For example, the fine matrix of the array sensor 130 can be used to create a fine resolution picture of a conductive object next to the phone. As an additional example, an ear can be mapped from the fine resolution picture to obtain more data for tuning than from previous methods. Additional performance enhancements may be performed. For example, as discussed, audio performance can be improved. For example, mobile communication devices are generally designed for audio optimization when a speaker 150 is sealed against a user's ear. The array sensor 130 can be used to improve speaker performance depending on the distance of the speaker 150 to the user's ear. Additionally, microphone gain 140 is typically designed for a specific mobile communication device position. The array sensor 130 can determine the proximity of the mobile communication device 10 to a user's head, mouth, and/or ear to optimize audio performance depending on the position of the mobile communication device 10.

The method of this invention is preferably implemented on a programmed processor. However, the operations of the controller 410 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the operations of the controller 410 may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted with other components of other embodiments. Accordingly, the preferred embodiments of the invention as set forth herein are intended to be illustrative, not limiting. Various changes may be made without departing from the spirit and scope of the invention.

What is claimed is:

1. A method of operation of a mobile communication device including an earpiece and a capacitive array sensor extending into a section of the mobile communication device including the earpiece, the method comprising:
    sensing a change in a capacitive field across the capacitive array sensor which extends into a section of the mobile communication device including the earpiece; and
    adjusting a parameter of operation of the mobile communication device based on the change in the capacitive field across the capacitive array sensor.

2. The method of operation of a mobile communication device according to claim 1, wherein the sensing step further comprises sensing a change in a capacitive field according to a conductive profile across the capacitive array sensor which extends into a section of the mobile communication device including the earpiece.

3. The method of operation of a mobile communication device according to claim 2, wherein the conductive profile comprises a portion of a human facial profile.

4. The method of operation of a mobile communication device according to claim 2, wherein the conductive profile comprises a portion of a human hand.

5. The method of operation of a mobile communication device according to claim 2, further comprising distinguishing between two different conductive profiles.

6. The method of operation of a mobile communication device according to claim 2, further comprising determining a type of conductive profile using a three dimensional map of the conductive profile.

7. The method of operation of a mobile communication device according to claim 2, wherein the conductive profile comprises a conductive body external to the mobile communication device.

8. The method of operation of a mobile communication device according to claim 7, wherein the parameter of operation comprises an illumination of the mobile communication device.

9. The method of operation of a mobile communication device according to claim 7, wherein the parameter of operation comprises at least one of an audible alert and a performance improvement message.

10. The method of operation of a mobile communication device according to claim 1,
    wherein the mobile communication device further comprises an antenna and antenna matching circuitry, and
    wherein the parameter of operation comprises a tuning of the antenna matching circuitry.

11. The method of operation of a mobile communication device according to claim 1, wherein the parameter of operation comprises a volume of the earpiece.

12. The method of operation of a mobile communication device according to claim 11, further comprising:
    detecting a distance of a portion of a human head from the capacitive array sensor,
    wherein the adjusting step further comprises increasing a volume of the earpiece based on the detected distance.

13. The method of operation of a mobile communication device according to claim 1, further comprising:
    detecting a distance of a portion of a human head from the capacitive array sensor,
    wherein the parameter of operation comprises a sensitivity of a microphone based on the detected distance.

14. A mobile communication device comprising:
    a housing;
    an earpiece coupled to the housing;
    an array sensor coupled to the housing, the array sensor extending into a section of the mobile communication device including the earpiece, the array sensor configured to: sense a change in a capacitive field across the array sensor which extends into a section of the mobile communication device including the earpiece; and adjust a parameter of operation of the mobile communication device based on the change in a capacitive field across the array sensor.

15. The mobile communication device according to claim 14, further comprising a keypad, wherein a portion of the array sensor is positioned underneath the keypad.

16. The mobile communication device according to claim 14, further comprising:
    a field sensing module coupled to the array sensor, the field sensing module being configured to sense a change in a field across the array sensor; and
    a parameter of operation adjustment module coupled to the field sensing module, the parameter of operation adjustment module being configured to adjust a parameter of operation of the mobile communication device in response to the change in the field across the array sensor.

17. The mobile communication device according to claim 16, further comprising a conductive profile detection module coupled to the field sensing module, the conductive profile detection module being configured to detect a conductive profile based on the change in the field sensed by the field sensing module.

18. The mobile communication device according to claim 17, wherein the conductive profile comprises a portion of a human facial profile.

19. The mobile communication device according to claim 17, wherein the conductive profile comprises a portion of a human hand.

20. The mobile communication device according to claim 17, further comprising a conductive profile distinguishing module coupled to the conductive profile detection module, the conductive profile distinguishing module being configured to distinguish between two different conductive profiles.

21. The mobile communication device according to claim 17, further comprising a conductive profile type determination module coupled to the conductive profile detection module, the conductive profile type determination module being configured to determine a type of conductive profile using a three dimensional map of the conductive profile.

22. The mobile communication device according to claim 17, further comprising:
    an antenna coupled to the housing; and
    antenna matching circuitry coupled to the antenna,
    wherein the parameter of operation comprises a tuning of the antenna matching circuitry.

23. The mobile communication device according to claim 17, wherein the parameter of operation comprises a volume of the earpiece.

24. The mobile communication device according to claim 17, further comprising:
a distance detection module configured to detect a distance of a portion of a human head from the array sensor,
wherein the parameter of operation adjustment module is further configured to increase a volume of the earpiece based on the detected distance.

25. The mobile communication device according to claim 17, further comprising:
a microphone coupled to the housing;
a distance detection module coupled to the field sensing module, the distance detection module being configured to detect a distance of a portion of a human head from the array sensor,
wherein the parameter of operation adjustment module is further configured to increase a sensitivity of the microphone based on the detected distance.

26. The mobile communication device according to claim 17, wherein the conductive profile comprises a conductive body external to the mobile communication device.

27. The mobile communication device according to claim 17, wherein the parameter of operation comprises an illumination of the mobile communication device.

28. The mobile communication device according to claim 17, wherein the parameter of operation comprises at least one of an audible alert and a message regarding improving performance.

29. A mobile communication device comprising:
a housing including
a housing face,
a first section, and
a second section,
the first section and the second section combining to cover the entire housing face;
a keypad coupled only to the first section of the housing; and
an array sensor extending substantially into the second section of the housing, the array sensor configured to: sense a change in a capacitive field across the array sensor which extends into a section of the mobile communication device including an earpiece; and adjust a parameter of operation of the mobile communication device based on the change in a capacitive field across the array sensor.

30. The mobile communication device according to claim 29,
wherein the first section comprises substantially one half of the housing face, and
wherein the second section comprises substantially one half of the housing face.

31. The mobile communication device according to claim 30, further comprising an earpiece,
wherein the earpiece is located in the second section and the array sensor extends substantially around the earpiece.

* * * * *